United States Patent
Grevers, Jr.

(10) Patent No.: US 8,468,558 B2
(45) Date of Patent: Jun. 18, 2013

(54) METHOD AND APPARATUS FOR BANDWIDTH CONSUMPTION USAGE REPORTING OF NON-MANAGED SOURCES

(75) Inventor: Theodore Grevers, Jr., Milford, MA (US)

(73) Assignee: Cisco Technology, Inc., San Jose, CA (US)

( * ) Notice: Subject to any disclaimer, the term of this patent is extended or adjusted under 35 U.S.C. 154(b) by 305 days.

(21) Appl. No.: 12/749,145

(22) Filed: Mar. 29, 2010

(65) Prior Publication Data

US 2011/0239242 A1    Sep. 29, 2011

(51) Int. Cl.
*H04N 7/173* (2011.01)
*H04N 7/16* (2011.01)

(52) U.S. Cl.
USPC ............ 725/14; 725/9; 725/95; 725/132

(58) Field of Classification Search
USPC ..... 725/14, 113, 95, 9, 11, 110, 132; 709/231
See application file for complete search history.

(56) References Cited

U.S. PATENT DOCUMENTS

| | | | | |
|---|---|---|---|---|
| 5,954,798 | A * | 9/1999 | Shelton et al. | 709/224 |
| 6,618,858 | B1 * | 9/2003 | Gautier | 725/132 |
| 2007/0294737 | A1 * | 12/2007 | Edwards et al. | 725/112 |
| 2009/0060028 | A1 * | 3/2009 | Liu et al. | 375/240.01 |
| 2009/0147779 | A1 * | 6/2009 | Foti | 370/389 |
| 2011/0095903 | A1 * | 4/2011 | Gudlavenkatasiva et al. | 340/870.02 |
| 2011/0131611 | A1 * | 6/2011 | Jaffery | 725/56 |
| 2011/0145887 | A1 * | 6/2011 | Morovitz et al. | 726/3 |
| 2011/0153749 | A1 * | 6/2011 | Howcroft | 709/206 |
| 2011/0191223 | A1 * | 8/2011 | Singh et al. | 705/34 |

OTHER PUBLICATIONS

"Report: Comcast usage meter is accurate," Dec. 2, 2009, http://www.cedmagazine.com/News-Comcast-usage-meter-accurate-120209.aspx, 2 pages.

* cited by examiner

*Primary Examiner* — Pankaj Kumar
*Assistant Examiner* — Reuben M Brown
(74) *Attorney, Agent, or Firm* — Merchant & Gould

(57) ABSTRACT

Embodiments of the present invention may establish a set top box client based apparatus. The set top box client based apparatus may actively monitor content playback by the set top box. The set top box client based apparatus may subsequently report client playback state for non-managed sources to a service provider's policy or operation support systems (OSS). Embodiments of the invention may recognize that some service providers may use a policy system and OSS, while others will only utilize an OSS for resource management.

13 Claims, 3 Drawing Sheets

METHOD AND APPARATUS FOR BANDWIDTH CONSUMPTION USAGE REPORTING OF NON-MANAGED SOURCES

FIELD OF THE DISCLOSURE

The present disclosure relates to a set top box client based apparatus which actively monitors content playback by the set top box and reports client playback state for non-managed sources to the service provider's policy or operation support systems (OSS).

BACKGROUND

Customers who plan to offer set top box services which include content sourced from the public Internet may be unable to determine how much bandwidth is consumed over an access network by content sourced from un-managed hosts. Un-managed hosts may include those Internet based services such as Disney, ESPN, over-the-top premium services and hundreds of other sources. Existing policy and operational support systems may have awareness to bandwidth consumption of managed services, such as the linear programming, on-demand (CDS-TV VoD pump), voice and other service provider managed systems, but no direct awareness of resource utilization by non-managed hosts.

BRIEF DESCRIPTION OF THE DRAWINGS

The accompanying drawings, which are incorporated herein constitute a part of this disclosure, illustrate various embodiments of the present invention. In the drawings.

Figure 1:
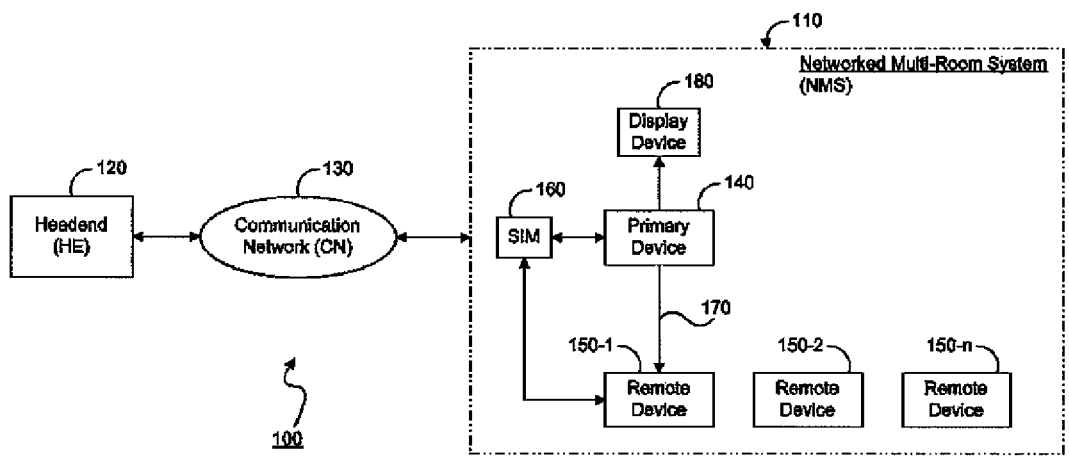
FIG. 1 illustrates operating embodiments of the present invention.

Both the foregoing general description and the following detailed description provide examples and are explanatory only. Accordingly, the foregoing general description and the followed detailed description should not be considered to be restrictive. Further, features or variations may be provided in addition to those set forth herein. For example, embodiments may be directed to various feature combinations and sub-combinations described in the detailed description.

DETAILED DESCRIPTION

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Embodiments of the present invention may establish a set top box client based apparatus. The set top box client based apparatus may actively monitor content playback by the set top box. The set top box client based apparatus may subsequently report client playback state for non-managed sources to a service provider's policy or operation support systems (OSS). Embodiments of the invention may recognize that some service providers may use a policy system and OSS, while others will only utilize an OSS for resource management.

An OSS may be computer systems used by telecommunications service providers. The term OSS most frequently describes "network systems" dealing with the telecom network itself, supporting processes such as maintaining network inventory, provisioning services, configuring network components, and managing faults. In some embodiments, the OSS may also comprise "business systems" dealing with customers, supporting processes such as taking orders, processing bills, and collecting payments. Other embodiments of an OSS are also contemplated by the present invention.

FIG. 1 is a simplified block diagram a non-limiting example of a conventional broadband communications system 100 in which embodiments of the present invention may operate. In this example, the communications system 100 may includes a local networked multi-room system (NMS) 110 that is coupled to a headend (HE) 120 via a communications network (CN) 130. The CN 130 may be any network that is suitable for carrying, preferably downstream and upstream, broadband multimedia signals, such as audio/video signals, IP signals, telephony signals, or data signals to name but a few. The CN 130 may be, for example, a hybrid fiber/coax (HFC) network, a fiber-to-the-home (FTTH) network, a satellite network, or a fixed wireless network (e.g., MMDS), among others.

The HE 120 may include one or more server devices for providing broadband signals, such as video, audio, and/or data signals, to a primary device 140 via the CN 130. The HE 120 and the primary device 140 cooperate to provide a user with a variety of services. The services may include, for example, analog or digital broadcast television services and channels, video-on-demand (VOD) services, and/or pay-per-view (PPV) services, among others. Each broadcast television channel typically provides a sequence of television presentations corresponding to a television station (e.g., ABC, NBC, CBS, or FNN) and is typically identified by a channel number (e.g., channel 2, channel 3, channel 4) that is available to a user at all times. Additionally, PPV services are typically transmitted to the primary device 140 at all times, but can only be viewed on the primary device 140 as provisioned. On the other hand, the primary device 140 typically requests a VOD service and, subsequently, the HE 120 transmits the presentation downstream to the primary device 140.

The NMS can include a router, but as shown in FIG. 1, the NMS 110 includes a splitter/isolator module (SIM) 160 that receives downstream broadband signals from the HE 120 and subsequently provides the downstream signals to the primary device 140 or to both the primary device 140 and any one or all of the remote devices 150-1 to 150-n depending on the implementation. Upon command from at least one of the remote devices 150-1 to 150-n, the primary device 140 may also forward selected real-time downstream signals and/or stored content signals to the requesting remote device 150-1, for example, via the SIM 160. The remote device 150-1 communicates with the primary device 140 by sending reverse control/command signals via coaxial cable requesting stored presentations, real-time signals, or the network guide. Other wired mediums, such as telephone lines or data cables, may be used so long as the transport format accommodates the desired transmission medium. The remote devices 150-1 to 150-n have access to all of the primary device 140's hardware and software functionality, along with receiving downstream signals directly from the headend via the SIM 160. Therefore, the remote devices 150-1 to 150-n may have limited resources, such as not including a storage device in order to record and store a presentation, thereby decreasing the overall costs to the service provider and the subscriber while offering advanced services to all of the remote devices 150-1 to 150-n that are networked to the primary device 140.

Furthermore, the primary device 140 may also directly provide signals, such as analog and digital channels, stored presentations, or the network guide to name but a few, to a coupled display device 180, which may be, for example, a television, computer, or PDA (personal digital assistant), among others. The primary device 140 may transmit signals to and receive control signals from the display device 180 via wireless devices (e.g., RF or IR devices) or a wired medium (e.g., coaxial cable, power lines, or telephone lines). It will also be appreciated that the primary device 140 may be incorporated in the display device 180.

The primary device 140, in accordance with one embodiment of the present invention, includes a processor, a tuner system, a storage device, a modulator, and a remote device communications receiver. Each of the remote devices, such as the remote device 150-1, may be identical to the primary device 140 but share the storage device contents of the primary device 140. Alternatively, the remote device 150-1 may be a simplified or conventional version of the primary device 140. A processor and a tuner system, which may be a simplified processor and only one tuner, may be included to extract channels from the received downstream broadband signals. Additionally, decryptors and decoders may be included to decode encoded signals for proper processing and display. Preferably, the remote device 150-1 includes a user input receiver, such as an IR receiver or an RF receiver that receives signals from a remote control, such as an IR remote control or an RF remote control. The remote control is not required and any user input device could be incorporated in the remote device 150-1.

In the event that the remote device 150-1, upon user input, requests a presentation, a reverse command signal is transmitted from the remote device 150-1 to the primary device 140 via the SIM 160. The remote device command receiver receives and demodulates the command signal according to its transmission method, such as frequency-shift keying (FSK) or on-off keying (OOK) transmission. The processor subsequently receives the demodulated command signals indicative of the requested action (e.g., requesting a presentation) and in accordance therewith instructs the tuner to tune to, for example, a channel carrying a real-time downstream signal, or the processor may retrieve a stored presentation from the storage device. The presentation's content signals are then provided to the modulator, which modulates the selected presentation prior to forwarding to the SIM 160.

Embodiments of the present invention may employ access methods based on wireline connectivity. For example, content may be delivered over fiber to a premises network using passive optical network technology. To serve a home, an optical fiber may extend from an optical line terminal at a headend. An optical splitter may send the same signal on a plurality of fibers which may serve a plurality of subscribers. At the subscriber's home, an optical network terminal may transfer data onto the corresponding wiring for phone, video and Internet access.

In some embodiments video on demand content and interactive features, such as programming guide data, may be delivered over an IPTV-based format. At a Optical Network Terminal (ONT) located at the subscriber's home, RF video may be sent over a coaxial connection to a set-top box that may handle both RF and IPTV video. An IP return path may be provided from the set-top box so that subscribers can order pay-per-view events.

Other embodiments of the present invention may use a quadrature amplitude modulation (QAM) modulator, which may be used for effectively transmitting signals over coaxial cable in a cable television environment.

The presentations stored in the storage device of the primary device 140 include program identifiers (PIDs), which may be indexed and stored as a table in the primary device's memory. The remote devices 150-1 to 150-n may watch a single stored presentation by remapping the PID value of the stored program to a different PID value prior to modulation. PID remapping comprises replacing the PID in the header of the packet with a different value. PID remapping can be accomplished with a variety of methods, such as, for example, by using a table, an algorithm, or hardware. In this manner, the single stored program basically remains in the storage device of the primary device 140, while the transmitted presentation is a version of the stored presentation having a remapped PID value.

If two remote devices request the same presentation, a version of the presentation on the primary device 140 is sent to each requesting remote device 150-1 to 150-n. Each version will have a different PID value. The processor in the primary device 140 alerts the requesting remote device, such as remote device 150-2, of the expected remapped PID value in order to ensure the remote device 150-2 extracts the requested presentation from a signal sent by the primary device 140.

To play a DVD movie from the primary device 140 to one or more remote devices 150-1 to 150-n simultaneously or at varying times, a portion or all of the content from the DVD must first be copied to the hard drive of the primary device 140. The primary device 140 transcodes the desired content of the DVD from an MPEG program stream to an MPEG transport stream and creates a PID value for the transport stream. With the presentation in an MPEG transport stream, trick play features are available while viewing the presentation. Also, the DVD presentation may have an encryption scheme, such as CSS encryption, which must be decrypted and then encrypted with a second encryption scheme particular to the NMS 110, such as the multi-room 3DES encryption, to ensure that the content remains secure over the NMS 110. The primary device 140 contacts the HE 120 to provide security and viewer data collection after copying the presentation to the primary device 140's hard drive. The HE 120 may also be contacted by the primary device 140 prior to DVD playback to secure permissions, pay royalties, etc., as negotiated by the cable operator and the DVD copyright holder. There is sufficient time to do this during the copying and transcoding processes. The HE 120 could also download additional material relevant to the movie and populate the VOD menu with similar or related movies.

Content may be requested over a network as described in FIG. 1 from non-managed sources, such as over-the-top or from the public Internet. Such content may have no way to communicate its properties to a service provider's policy or operating support systems (OSS). Furthermore, the existing OSS may have no way to determine available access network resources on the consumer's access network while content is being streamed to the consumer. When content is streamed from the public Internet, it may not follow the well defined standards that service providers may rely upon to produce a quality playback experience.

In fixed bandwidth networks, knowledge of the available bandwidth may be critical when making real-time decisions concurrently with a user requesting an additional bandwidth consuming service. Content streamed from the Internet may consume resources which other systems, including the delivery of linear or on-demand content from service provider sources may share. Without real-time knowledge of the available bandwidth on the subscriber's access network, playback quality may be degraded due to insufficient access network resources.

Embodiments of the present invention comprise an apparatus within a set top box client. The apparatus may monitor the state of a media player in use within the set top box, in conjunction with the source from which the media player is accessing its content. These two criteria may allow the apparatus to determine if it should notify the service provider's policy system or operating system that the consumer is streaming content from Internet sources.

The apparatus may publish a formatted signal which includes three key fields. One such field may comprise the identity of the set top box. Although the policy system or OSS could identify who the consumer is by the IP address of their broadband gateway, the identity of the set top box itself may allow the policy system or OSS to maintain more detailed records of how bandwidth is consumed for a given consumer. The second field contained within the formatted signal may comprise the rate at which the content is received by the set top box. This second field may allow the policy system or OSS to keep record of bandwidth consumption in addition to other services already in use by the consumer. Note that this second field does not focus on the encoded rate, but rather the rate at which the content may be received by the set top box. The third field may comprise a unique content identifier which may identify the source of the content. This third field may allow the policy system or OSS to track the streaming media via the unique content identifier. The unique content identifier may be required by the policy system or OSS when the set top box notifies the policy system or OSS that a specific streamed event has been terminated, and the bandwidth is no longer in use.

A policy apparatus may be created within the policy system or OSS, which is responsible for receiving formatted signals from the apparatus that is resident within the consumer's set top box client. The policy apparatus within the policy system may be responsible for mapping the set top box to the subscriber's account. The policy apparatus may further add content stream rate information to existing account statistics. The unique content identifier may also be tracked, which may allow for the accurate removal of stream data from the account when the stream has completed at the set top box. In some embodiments of the present invention, the policy apparatus within the policy system and OSS may operate such that the policy system also proxies the formatted setup and teardown signal to the OSS.

In some embodiments, a household may have a plurality of set top boxes. For example, a household may contain three set top boxes. If two of the set top boxes are consuming video on demand or linear programming from service provider managed sources, the OSS may be aware of the resources consumed from those managed services. If the third set top box in the home is consuming streaming media from Internet sources, the operating system may now have knowledge of the volume of resources consumed by the stream.

Figure 2:
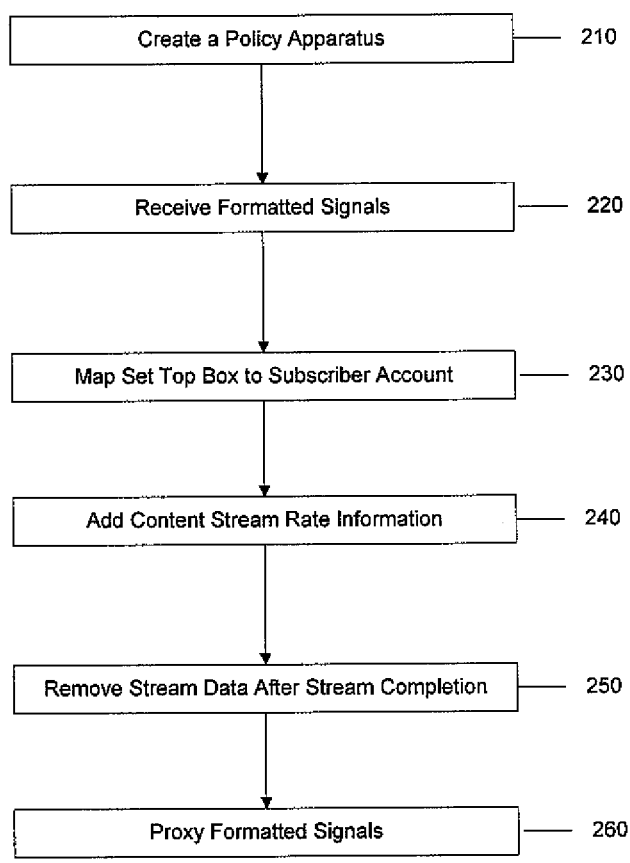
FIG. 2 illustrates a flow chart of embodiments of the present invention.

FIG. 2 illustrates a flow chart showing embodiments of the present invention. The method may begin at step 210 where a policy apparatus may be created within a policy system. Once a policy apparatus is created, the method may proceed to step 220 where formatted signals may be received from an apparatus resident within the consumer's set top box client.

The method may then proceed to step 230 where the set top box being used may be mapped to the subscriber's account. After mapping is complete, the method may proceed to step 240 where content stream rate information may be added to existing account statistics. In some embodiments, a unique content identifier associated with the requested content may be tracked by the system.

In some embodiments, the method may proceed to step 250 wherein stream data may be removed from the account when the stream has completed at the set top box. Finally, in some embodiments, the method may proceed to step 260 where the formatted signals may be proxied to an operation support system.

Figure 3:
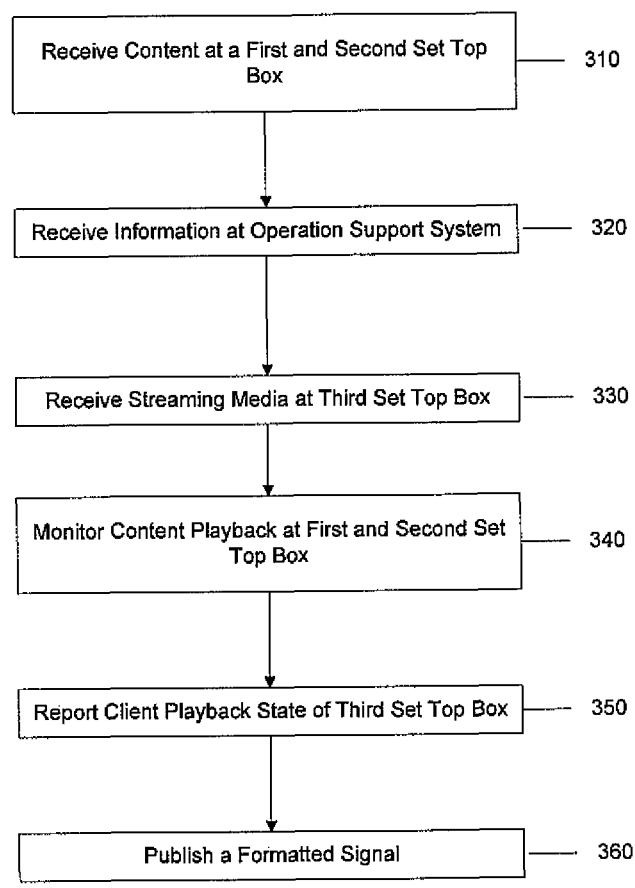
FIG. 3 illustrates a flow chart of embodiments of the present invention.

FIG. 3 illustrates a flow chart showing embodiments of the present invention. The method may begin at step 310 where linear programming content may be received at a first set top box and a second set top box. The method may proceed to step 320 wherein information may be received at an operation support system identifying the level of resources consumed by the first set top box and the second set top box.

Once the operation support system identifies the level of resources consumed by the first set top box and the second set top box, the method may proceed to step 330 where streaming media may be received at a third set top box in communication with the first set top box and the second set top box across a consumer access network. In some embodiments, the streaming media is received over the Internet. In some embodiments, the consumer access network may include a plurality of set top boxes in a single household.

Next, the method may proceed to step 340, where content playback at the first set top box and the second set top box may be monitored. Then, a step 350, the client playback state for the third set top box may be reported to a service provider's policy or operation support system. In some embodiments, available access network resources may be determined on the consumer access network while content is being streamed to the consumer on one of the first set top box and the second set top box.

Finally, the method may proceed to step 360 where a formatted signal may be published, wherein the formatted signal comprises: the identity of one of the plurality of set top boxes, the rate at which the content is received by the one of the plurality of set top boxes, and a unique content identifier which identifies the source of the content.

Embodiments of the present invention may be embodied in any computer-readable medium for use by or in connection with an instruction execution system, apparatus, or device. Such instruction execution systems may include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or that is based on electronic, magnetic, optical, electromagnetic, infrared, or semiconductor technology.

Specific examples of a computer-readable medium using electronic technology would include (but are not limited to) the following: random access memory (RAM); read-only memory (ROM); and erasable programmable read-only memory (EPROM or Flash memory). A specific example using magnetic technology includes (but is not limited to) a portable computer diskette. Specific examples using optical technology include (but are not limited to) compact disk (CD) and digital video disk (DVD).

Any software components illustrated herein are abstractions chosen to illustrate how functionality may be partitioned among components in some embodiments of the present invention disclosed herein. Other divisions of functionality may also be possible, and these other possibilities may be intended to be within the scope of this disclosure. Furthermore, to the extent that software components may be described in terms of specific data structures (e.g., arrays, lists, flags, pointers, collections, etc.), other data structures providing similar functionality can be used instead.

Any software components included herein are described in terms of code and data, rather than with reference to a particular hardware device executing that code. Furthermore, to the extent that system and methods are described in object-oriented terms, there is no requirement that the systems and methods be implemented in an object-oriented language. Rather, the systems and methods can be implemented in any programming language, and executed on any hardware platform.

Any software components referred to herein include executable code that is packaged, for example, as a standalone executable file, a library, a shared library, a loadable module, a driver, or an assembly, as well as interpreted code that is packaged, for example, as a class. In general, the components used by the systems and methods of reducing media stream delay are described herein in terms of code and data, rather than with reference to a particular hardware device executing that code. Furthermore, the systems and methods can be implemented in any programming language, and executed on any hardware platform.

The flow charts, messaging diagrams, state diagrams, and/or data flow diagrams herein provide examples of the operation of systems and methods of reducing media stream delay through independent decoder clocks, according to embodiments disclosed herein. Alternatively, these diagrams may be viewed as depicting actions of an example of a method. Blocks in these diagrams represent procedures, functions, modules, or portions of code which include one or more executable instructions for implementing logical functions or steps in the process.

Alternate implementations may also be included within the scope of the disclosure. In these alternate implementations, functions may be executed out of order from that shown or discussed, including substantially concurrently or in reverse order, depending on the functionality involved. The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A monitoring system comprising:
   a first set top box for receiving content;
   a media player within the set top box capable of determining content criteria;
   a client based apparatus for actively monitoring content playback at the first set top box;
   the client based apparatus further configured to report the client playback state for non-managed sources to a service provider's policy or operation support system;
   the client based apparatus further configured to determine if it should notify the service provider's policy system or operation support system that the consumer is streaming content from a non-managed source; and
   the client based apparatus further configured to publish a formatted signal, wherein the formatted signal comprises: the identity of the set top box, the rate at which the content is received by the set top box, and a unique content identifier which identifies the source of the content; and
   the policy system or operation support system further configured to receive the formatted signal from the client based apparatus and to make bandwidth provisioning decisions based on the formatted signal.

2. The monitoring system of claim 1, wherein the service provider uses both a policy system and an operation support system for resource management.

3. The monitoring system of claim 1, further comprising a second set top box receiving content from a non-managed source, wherein the first set top box and the second set top box are connected to a consumer access network.

4. The monitoring system of claim 3, wherein the non-managed source is the Internet.

5. The monitoring system of claim 3, wherein the client based apparatus determines available access network resources on the consumer's access network while content is being streamed to the consumer on one of the first set top box and the second set top box.

6. The monitoring system of claim 1, wherein the client based apparatus is internal to the first set top box.

7. The monitoring system of claim 1, wherein the client based apparatus stores bandwidth consumption measurements.

8. The monitoring system of claim 1, wherein the policy system or operation support system requires the unique content identifier to indicate that a specific streamed event has been terminated and the bandwidth is no longer in use.

9. A method comprising:
   receiving content at a set-top box comprising a media player capable of determining content criteria;
   creating a policy apparatus within a policy system for actively monitoring content playback at the set-top box;
   reporting the content playback state for non-managed sources to an operation support system;
   determining whether to notify the operation support system that the set-top box is streaming content from a non-managed source
   receiving formatted signals from an apparatus resident within the set top box, wherein the formatted signals comprise: an identifier associated with the set-top box, the rate at which the content is received by the set-top box, and a unique content identifier which identifies the source of the content; and
   making bandwidth provisioning decisions based on the formatted signal.

10. The method of claim 9, further comprising: removing of stream data from the account when the stream has completed at the set top box.

11. The method of claim 9, further comprising: proxying the formatted signals to an operation support system.

12. The method of claim 9, wherein the content is received on-demand over the Internet.

13. The method of claim 12, further comprising: determining available consumer access network resources on the consumer access network while the content is being streamed to the consumer on the set top box.

* * * * *